(12) United States Patent
Schwender

(10) Patent No.: US 9,943,792 B2
(45) Date of Patent: Apr. 17, 2018

(54) FILTER MATERIAL FOR A FLUID AND DRAINAGE LAYER FOR SUCH A FILTER MATERIAL INCLUDING A FILTER ELEMENT

(71) Applicant: Hydac Filtertechnik GmbH, Sulzbach/Saar (DE)

(72) Inventor: Matthias Schwender, Kirkel (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 226 days.

(21) Appl. No.: 14/758,629

(22) PCT Filed: Jan. 17, 2014

(86) PCT No.: PCT/EP2014/000121
§ 371 (c)(1),
(2) Date: Jun. 30, 2015

(87) PCT Pub. No.: WO2014/111265
PCT Pub. Date: Jul. 24, 2014

(65) Prior Publication Data
US 2015/0336038 A1 Nov. 26, 2015

(30) Foreign Application Priority Data
Jan. 19, 2013 (DE) .................. 10 2013 000 933

(51) Int. Cl.
*B01D 39/16* (2006.01)
*B01D 39/08* (2006.01)

(52) U.S. Cl.
CPC ......... *B01D 39/083* (2013.01); *B01D 39/086* (2013.01); *B01D 39/16* (2013.01); *B01D 39/1623* (2013.01)

(58) Field of Classification Search
None
See application file for complete search history.

(56) References Cited

U.S. PATENT DOCUMENTS

| | | | |
|---|---|---|---|
| 5,664,628 A | 9/1997 | Koehler et al. | |
| 2005/0269256 A1 | 12/2005 | Haq et al. | |
| 2007/0175191 A1 | 8/2007 | Ziebold et al. | |
| 2013/0146529 A1* | 6/2013 | Schwender | B01D 39/083 |
| | | | 210/490 |

FOREIGN PATENT DOCUMENTS

| | | |
|---|---|---|
| DE | 26 00 228 A1 | 7/1976 |
| DE | 43 11 297 A1 | 10/1994 |
| DE | 600 34 247 T2 | 12/2007 |
| DE | 10 2007 040 892 A1 | 2/2009 |
| DE | 10 2010 025 218 A1 | 12/2011 |
| WO | WO 98/30315 A1 | 7/1998 |
| WO | WO 03/033100 A1 | 4/2003 |

* cited by examiner

*Primary Examiner* — Benjamin M Kurtz
(74) *Attorney, Agent, or Firm* — Wenderoth, Lind & Ponack, L.L.P.

(57) ABSTRACT

A filter material for a fluid, particularly a hydraulic fluid, has a multi-layer filter medium (10) through which a fluid can flow and having a filter layer (20) and a drainage layer (32) forming a three-dimensional structure designed to enlarge the flow channels formed for the fluid to flow through. The drainage layer cooperates with an adjacent drainage layer and/or has individual line elements (33) that form a mesh or grid structure. Those line elements are arc-shaped or curved at least to some extent.

18 Claims, 3 Drawing Sheets

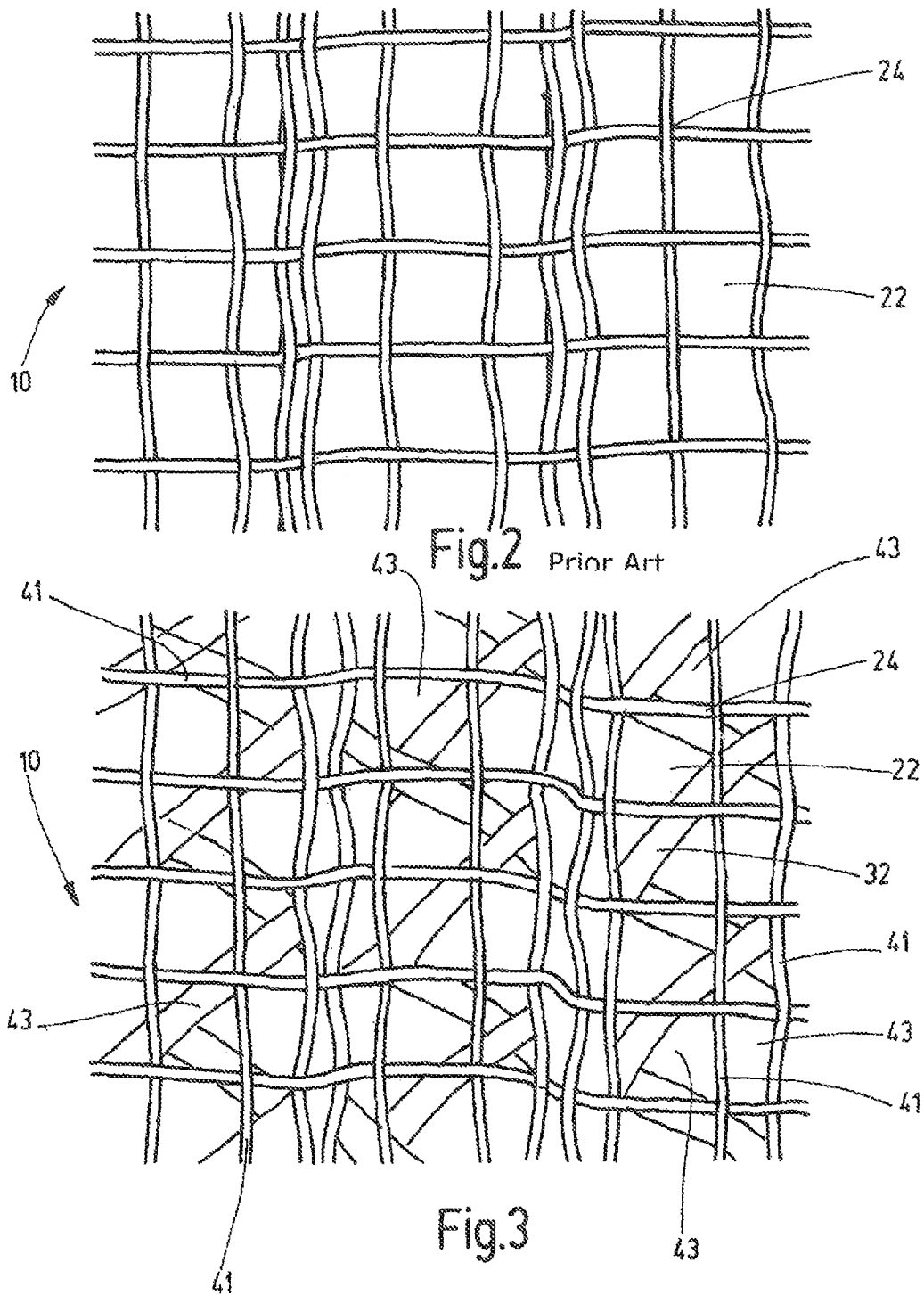

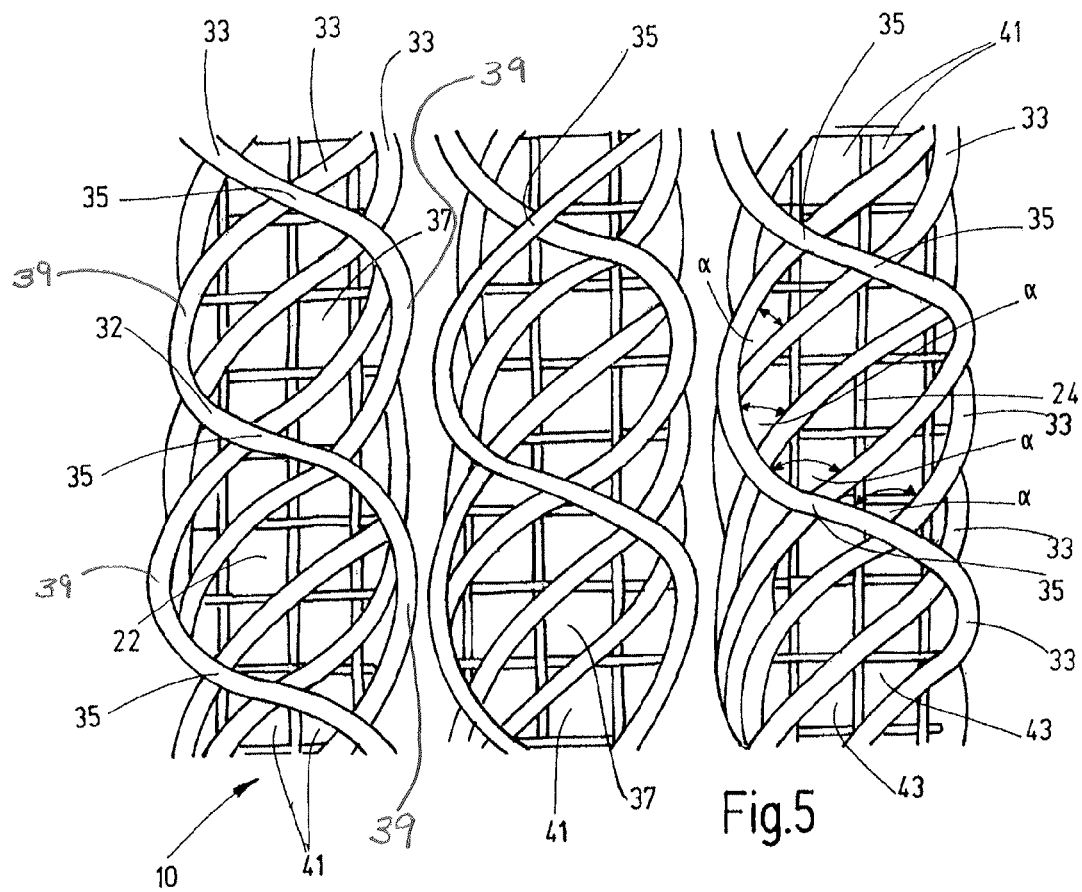
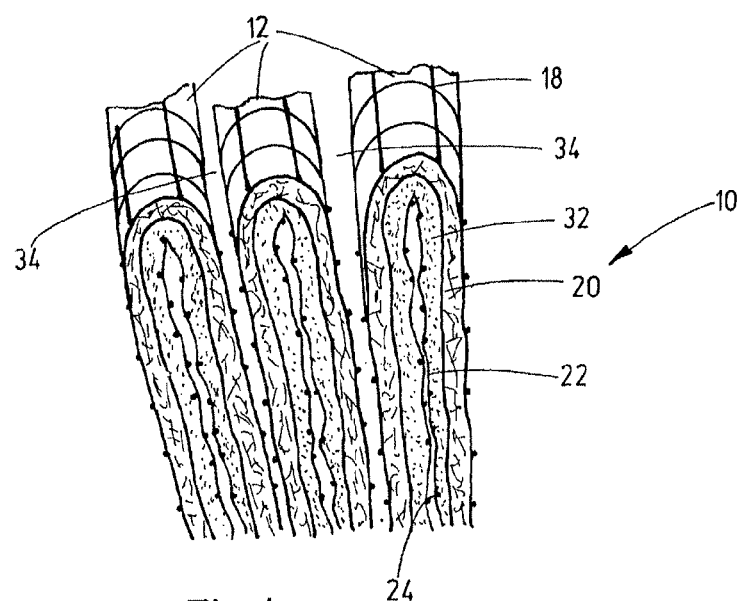

FILTER MATERIAL FOR A FLUID AND DRAINAGE LAYER FOR SUCH A FILTER MATERIAL INCLUDING A FILTER ELEMENT

FIELD OF THE INVENTION

The invention relates to a filter material for a fluid, in particular in the form of a hydraulic fluid, which has a multi-layer filter medium through which a fluid can flow, and which has at least one filter layer. The invention furthermore relates to a drainage layer, in particular provided for such a filter material, and to a filter element made with such a filter material.

BACKGROUND OF THE INVENTION

Filter materials for producing replaceable filter elements in hydraulic systems are known in many different designs (U.S. Patent Publication No. 2005/0269256 A1, U.S. Patent Publication No. 2007/0175191 A1, etc.) and comprise, for example, a nonwoven filter, preferably composed of multiple layers, having a support layer on one side, but preferably on both sides (upstream side and/or downstream side). When fluid flows through the filter material, considerable pressure differences result to some extent between the raw or dirty side and the clean side.

To be able to withstand these pressure differences and also dynamic flow forces in the unfiltrate or infiltrate (i.e., the unfiltered fluid), the filter materials, of which corresponding filter elements are made, have support layers. Such support layers or support structures are subject to an alternating pressure load during operation of the filter element. Known support structures can be formed of metal fabrics, in particular fabrics made of high-grade steel wires, which prove to be particularly stable. In the prior art, such fabrics are executed as standard fabrics (DE 600 34 247 T2), also in the manner of a plain weave, wherein the threads are always woven so as to alternate above and then again below the next thread. Known filter materials having support layers and filter layers formed in this manner do not satisfy the requirements placed on them with regard to fluid permeability, which is as high as possible, with high mechanical stability, even if, in addition to support layers and filter layers, a fluid-guiding drainage layer is provided in the form of a grid or fabric, both on the fluid upstream as well as on the fluid downstream side of the filter material, or if larger mesh sizes or coarser grids are provided, so as to obtain lower flow resistances. The latter cases result in the disadvantage of the lower resilience against alternating pressure loads during operation.

SUMMARY OF THE INVENTION

An object of the invention is to provide an improved filter material that ensures a high fluid-permeability despite good structural strength.

According to the invention, this object is basically achieved by a filter material having, as an essential feature of the invention, a layer composite of the filter material. In addition to at least one first drainage layer or flow path defining layer, which can also be formed from a support layer or a support grid, an additional drainage layer forming a three-dimensional structure is provided to enlarge the flow channels formed for the fluid flowing through it. On one hand, an additional three-dimensional structure effects the creation of additional flow channels, which leads to a decrease in the pressure differential, in particular on the downstream side of the filter material, where very narrow flow channels are created due to a star folding of the filter material. On the other hand, an increased resilience against alternating pressure loads also results on the upstream side of the filter material due to the stabilizing of the pleats by decreasing the pleat spacings, as it results from the presence of the drainage layer. Due to the formed additional flow channels of the additional further drainage layer, the pleat spacings of the pleated filter mat or of the pleated filter medium are decreased, leading to an additional stabilization of the individual pleats. Particularly advantageously, the additional drainage layer is flush with an adjacent drainage layer.

Another important feature of the invention is the drainage layer being provided for increasing the fluid flow and forming a three-dimensional structure with the line elements. The line elements are used for and form the mesh or grid for the drainage layer, and are arc-shaped or curved, at least to some extent. This structure creates a particularly high structural stability for this drainage layer, and therefore, for the entire filter medium in a desired manner. Additional flow channels having a particularly large cross section are furthermore created, which leads to a decrease of the pressure differential, in particular on the downstream side of the filter material, where very narrow flow channels are created due to the common star folding of the filter material. The fact that, due to being curved, a helical guide for the fluid is obtained, also contributes to this decrease of the pressure differential, which leads to an energy input having improved flow through the filter medium.

On the other hand, an increased resilience to alternating pressure loads results due to the stabilizing of the pleats by decreasing the pleat spacings on the upstream side of the filter material, as follows from the presence of the drainage layer having the curved, helical arcs for the line elements.

In the case of a preferred embodiment of the solution according to the invention, two line elements, which extend adjacent to one another in an arc-shaped manner at least to some extent, are provided to define a flow chamber between two consecutive cross points such that the largest opening width of the flow chamber is formed between two apexes of the curved course, which are spaced apart from one another. Preferably, the flow chamber is shaped as approximately circular, elliptical or in the manner of a rhombus, between two adjacent curved courses. A particularly good compromise with regard to good stability characteristics and high fluid permeability can be realized thereby. The flow chambers form individual flow channels, which, being defined by the line elements, provide for an optimal, helical flow guide within a filter element that is equipped with the filter material according to the invention.

Particularly preferably, least one support layer is composed of line-shaped grid or mesh elements, which border individual outlets at the edges thereof. In this respect, a particularly good support for the entire filter material or filter medium is then attained by the arc-shaped courses of the line-shaped elements of the drainage layer. The respective support layer assumes the function of a common first drainage layer, which interacts with the additional drainage layer, preferably in the case of a flat arrangement.

A drainage layer, in particular provided for the above-described filter material, is also the subject matter of the invention. The individual line elements of the drainage layer are arc-shaped or curved at least to some extent. Particularly preferably, they are arranged within a repeating pattern so as to be curved in an S-shape at least to some extent.

A filter element, which is provided for use in a filter device for fluid, in particular for hydraulic fluid, has a filter material according to the invention. Particularly preferably, a drainage layer is also subject matter of the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2 is an enlarged top view of a partial area of a filter material according to the prior art;

FIG. 3 is an enlarged top view, a partial area of a filter material according to an exemplary embodiment of the invention;

FIG. 4 is an enlarged, perspective view of only a partial area of the filter material adjoining the pleat tips, according to the exemplary embodiment of FIG. 3; and FIG. 5 is a top view of a partial area of a filter material adjoining the pleat tips, according to a second exemplary embodiment of the invention.

DETAILED DESCRIPTION OF THE INVENTION

Figure 1:
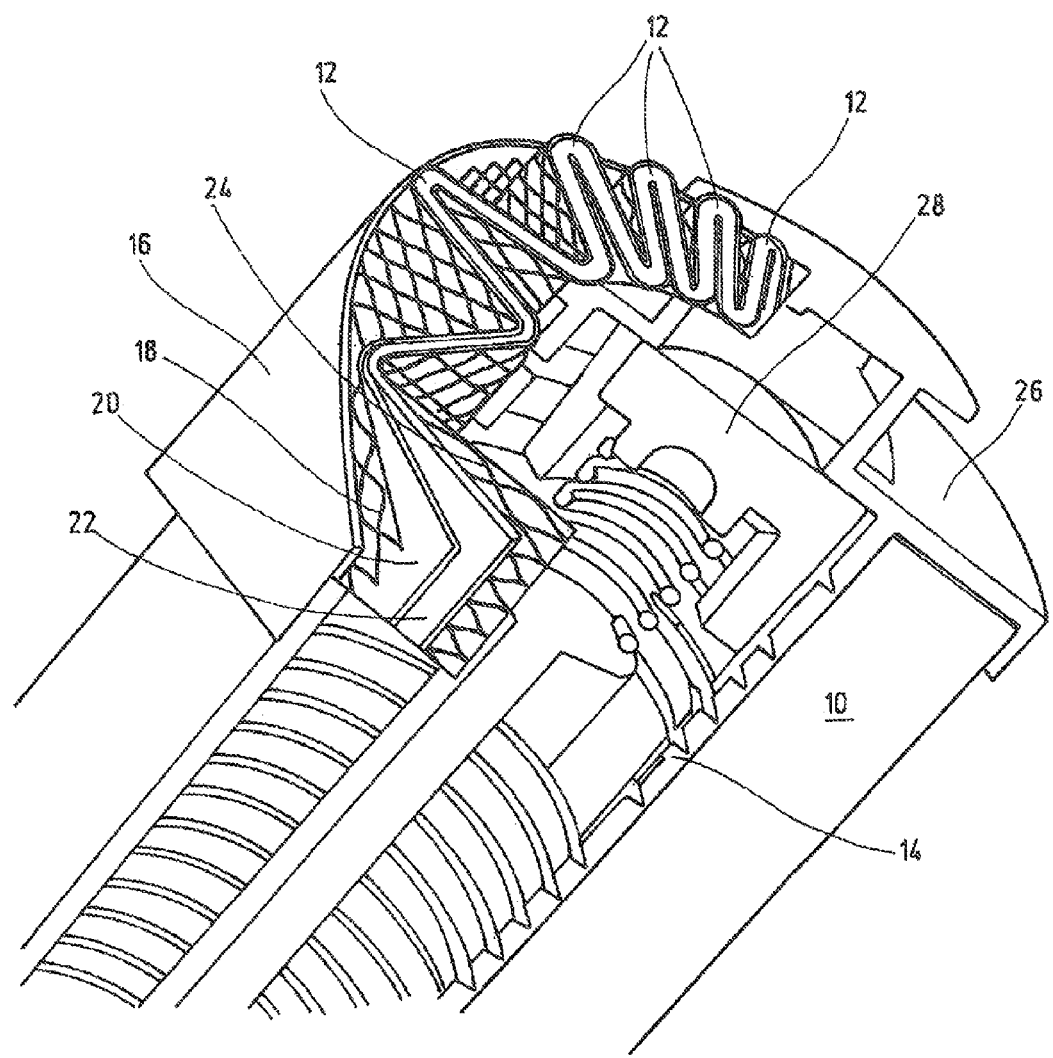
FIG. 1 is an enlarged perspective view, partially in section and schematically simplified of the upper part of a filter element having a filter material according to the prior art.

The filter element partially illustrated in FIG. 1, as it belongs to the prior art, has a filter mat 10 as the filter material, having a predefinable surface area and predefinable filter characteristics. The filter mat 10 is pleated, as illustrated in FIG. 1, with individual filter pleats 12, which, in a tight package sequence, extend between an inner fluid-permeable support tube 14 and an outer cylindrical housing shell 16, which is likewise fluid-permeable. For the sake of a better depiction, the individual filter pleats 12 are depicted slightly pulled apart, and the individual layer structure of the pleated filter mat 10 is revealed from the partial depiction facing the observer. The filter pleats 12 form a W-shape or V-shape and define fluid gaps between one another. The volume of the gaps increases towards the upstream side, which is directed outward.

Prior art of filter elements are constructed in such a manner that the filter mat 10 typically comprises a first support layer 18, a second layer 20 as protective nonwoven, a third layer 22 as main nonwoven or filter layer, an optional further adjoining layer of a protective nonwoven (not depicted), or a further filter layer and, in any event, a fourth layer of a new support layer 24 that extends on the inner circumference. The support layers 18, 24 can each be a wire fabric, a plastic grid or a plastic fabric, among others. One of the layers can additionally be used as drainage layer. The protective nonwoven layers 20 are routinely composed of a plastic nonwoven. The main nonwoven or filter layers 22 are composed of materials such as glass fiber paper, synthetic filter material (melt-blown fibers), cellulose paper, or the like. The layers can also be made of composite materials of the same or of different types. As a function of the layer structure and of the respective used filter materials, the filter mat 10 has predefinable filter characteristics, in accordance with the filtration task. On principle, a high pressure differential stability is desired, as well as a high beta stability across a wide pressure differential range and a predefinable filter fineness. Sufficient flow channels should be available at the filter element for decreasing the pressure differential, while a good resilience against changing compressive loads should be ensured at the same time.

Seen from the perspective view of FIG. 1, the fluid flows through the filter mat 10, in the case of the known filter element, from the outside (upstream side) to the inside (downstream side) and is supported on the inner circumference at its respective pleat deflections against the outer circumference of the support pipe 14 with its annular apertures. However, the fluid to be cleaned can also flow through differently designed filter elements in the reverse direction, so that the above-mentioned upstream side becomes the downstream side and vice versa. The filter mat ends, in each case, are accommodated in an end cap. Only the upper end cap 26 is illustrated partially in FIG. 1. This upper end cap 26 comprises a spring-loaded bypass valve 28, which, for safety reasons, permits a fluid to pass through, even if the filter mat 10 should be clogged and blocked by contaminants.

FIG. 2 shows a top view of a filter material in the form of a filter mat 10 according to the prior art. A standard support layer 24 is formed by a metallic grid. Such a grid, optionally having a further inner support layer not visible in FIG. 2, serves as drainage layer to create flow channels for allowing the fluid to flow through.

In contrast, the exemplary embodiment of the filter material according to the invention shown in FIG. 3 differs therefrom in that a drainage layer or flow path defining layer 32, which is also referred to as an additional drainage layer 32, is provided for an additional drainage function by forming enlarged flow channels. To provide such additional flow channels in the area of the downstream side of the filter mat 10, the drainage layer 32 is provided directly below the outer support layer 24 in the exemplary embodiment of FIG. 3, where the downstream side of the filter mat 10 is visible. To create clearances, this drainage layer 32 is a three-dimensional structure element. In the present example, a grid-shaped structure made of plastic, for example of polybutylene terephthalate, polypropylene or polyester, is provided. A metallic fabric or plastic fabric, which can provide for an electric voltage discharge, can likewise be provided.

In addition to the drainage effect, the drainage layer 32, which is disposed on the inside in the case of the exemplary embodiment of FIGS. 3 and 4, contributes to the pleat stabilization. As can be derived from FIG. 4, the additional volume of the drainage layer 32, which represents a three-dimensional formation, has the result that the filter pleats 12 adjoin the pleat tips of the upstream side more closely with smaller spacings 34 (see FIG. 4). The additional drainage layer 32 thus also forms a further support layer for the filter mat 10.

In the case of the exemplary embodiment of FIG. 5, the drainage layer 32 is disposed as an outer layer on the downstream side of the filter mat 10. In the case of the depicted example, the drainage layer 32 is formed by an irregular grid structure made of plastic. When disposed on the downstream side of the filter mat 10, where very narrow flow channels result due to the star folding (pleating), the drainage layer 32 makes a particularly effective contribution to decreasing the flow resistance, and thus, the pressure differentials, which are created during operation.

As is shown in particular in FIG. 5, at least the line elements 33 of the drainage layer 32 are provided with an arc-shaped or curved course. In particular, the arc-shaped or curved course within a repeating pattern. In the case of which the weave pattern repeats, the pattern is embodied in the manner of S-shaped line elements 33. Between two consecutive cross points 35, two line elements 33, which extend adjacent to one another in an arc-shaped manner, define a flow chamber 37, the largest opening width of which is between two apexes 39, which are spaced apart from one another, of the arc-shaped courses. The flow chamber 37 formed in this manner, between two adjacent curved courses of the line elements 33, is embodied thereby, approximately, in the manner of an ellipsis or of a rhombus.

At the cross points 35, in the case of which the arc-shaped line elements 33 rest against one another, on top of one another, the curved line elements in each case form an angle α. The angle changes continuously within predefinable angle limits within a repeating pattern, increasing continuously downwards, in particular when viewed from the perspective depicted in FIG. 5.

The support layer 18 or 24, which is disposed thereunder, is formed of line-shaped grid or mesh elements 41, which border on individual outlets 43 for the fluid at the edges. The outlets 43 of the respective support layers 18, 24 have a rectangular or rhombic shape thereby. In the shown exemplary embodiment according to FIG. 5, the shape is in the manner of a rectangle.

The flow chambers 37 of the drainage layer, in turn, are designed in the manner of channel-shaped flow guides, which are bordered, at least to some extent, on the edge side by the line elements 33, which extend in an arc-shaped manner. Helically formed flow channels, which ensure an improved fluid entry into the other layers of the filter material, including the respective support layer 18, 24 thereof, are created in such a way. Particularly preferably, the free flow cross section of the flow chambers 37 of the drainage layer 32 is dimensioned to be equal to or preferably larger than, particularly preferably twice as large as, the flow openings 43 of the support layer 18 or 24 located thereunder.

The individual line elements 33, 41, which are connected to one another in a mesh-shaped manner, of drainage layer 32 or of the respective support layer 18 or 24, respectively, are embodied as filaments, threads, yarns or fibers made of plastic and/or metal materials and are part of a screen, braided fabric, knitted fabric, fabric or, as illustrated, in the form of a mesh-like grid.

As already specified, the drainage layer 32 can support itself directly at a support grid 18 or 24, which can be assigned thereto, in that the line elements 33, 41 are in direct contact with one another at least to some extent. However, the drainage layer 32 can be disposed between two other layers, preferably between a further drainage layer (not depicted) in the layer composite and one of the support layers 18, 24. In particular, drainage layer 32 can not only be arranged on the downstream side within the filter material, but instead can also be arranged on the upstream side. Particularly preferably, however, the drainage layer 32 is disposed on the downstream side, upstream of the inner further support layer 24. This kind of drainage layer 32 can additionally or alternatively also be disposed in the outermost area, in the flow direction upstream of the first support layer 18.

As specified above, the mentioned drainage layer 32, together with the filter material described therein, can be combined to form a filter element in accordance with the depiction in FIG. 1. However, the drainage layer 32 can also be used as an independent component with other filter media or filter materials, also in non-pleated form, for a fluid filtration, also in the form for beverage filtration.

While various embodiments have been chosen to illustrate the invention, it will be understood by those skilled in the art that various changes and modifications can be made therein without departing from the scope of the invention as defined in the claims.

The invention claimed is:

1. A filter material for fluids, the filter material comprising:
   a multi-layer filter medium through which a fluid can flow and including a filter layer, a first flow path defining layer and a second flow path defining layer, said second flow path defining layer having a thickness with enlarged flow channels formed therein for fluid to flow therethrough relative to flow channels in said first flow path defining layer; and
   two individual line elements of said second flow path defining layer extending adjacent to one another along arc-shaped paths at least to some extent and defining flow chambers between pairs of two consecutive cross points of said two individual line elements, each of said flow chambers having a largest opening width formed between two apexes of the arc-shaped paths that are spaced from one another, said two individual line elements rest against one another and on top of one another at the cross points, said two individual line elements forming angles therebetween changing gradually within each repeat of a repeating pattern of said two individual line elements.

2. A filter material according to claim 1 wherein
   said second flow path defining layer is disposed on a downstream side of the filter material.

3. A filter material according to claim 1 wherein
   said second flow path defining layer is flush with and adjacent to said first flow path defining layer.

4. A filter material for a fluid, the filter material comprising:
   a multi-layer filter medium through which a fluid can flow and including a filter layer and a flow path defining layer, said flow path defining layer having a thickness with flow channels formed therein for the fluid to flow therethrough and being composed of individual line elements forming at least one of a mesh or grid, said individual line elements being at least one of arc-shaped or curved, at least to some extent, two of said individual line element extending adjacent to one another in an arc-shape, at least to some extent, and defining flow chambers between each pair of two consecutive cross points of said two of said individual line elements, each of said flow chambers having a largest opening width formed between two apexes of arc-shaped courses of said two of said individual line elements that are spaced apart from one another, said cross points of said two of said line individual elements resting against one another and on top of one another, said two of said line individual elements defining an included angle therebetween changing gradually within each repeat of a repeating pattern of said two individual line elements.

5. A filter material according to claim 4 wherein
   each of said flow chambers has a shape approximately of at least one of a circle, ellipse or a rhombus between said two of said individual line elements.

6. A filter material according to claim 4 wherein
   support layers sandwich said multi-layer medium therebetween, at least one of said support layers comprise at least one of line-shaped grid elements or mesh elements bordering individual outlets for the fluid at edges of said support layers and forming a flow path defining layer.

7. A filter material according to claim 6 wherein said outlets of said support layers are in shapes of at least one of rectangles or rhombuses.

8. A filter material according to claim 4 wherein said flow chambers are channel-shaped guides bordered, at least to some extent, at edges thereof by said individual line elements extending in arc-shapes.

9. A filter material according to claim 6 wherein said flow chambers of said flow path defining layer have flow cross sections dimensioned at least equal to flow openings of said support layers.

10. A filter material according to claim 9 wherein said flow cross sections are larger than said flow openings of said support layers.

11. A filter material according to claim 9 wherein said flow cross sections are twice as large as said flow openings of said support layers.

12. A filter material according to claim 4 wherein said individual line elements of said flow path defining layer comprise at least one of filaments, threads, yarns or fibers made of at least one of plastic or metal material, are connected to one another as a mesh and are part of at least one of a screen, braided fabric, knitted fabric, or grid.

13. A filter material according to claim 6 wherein said flow path defining layer is supported directly at one of said support layers; and
said individual line elements are in direct contact with one another at least to some extent.

14. A filter material according to claim 6 wherein said flow path defining layer is arranged between two other layers.

15. A filter material according to claim 4 wherein said flow path defining layer is disposed as an outer layer or on an upstream side of said multi-layer medium.

16. A filter material according to claim 6 wherein said individual line elements of said flow path defining layer have diameters greater than diameters of line-shaped grid elements of said support layers.

17. A filter material according to claim 4 wherein said multi-layer medium has a layer structure in a fluid flow direction therethrough as viewed from an inside to an outside of said flow path defining layer, an adjacently disposed flow path defining layer, a support layer, a filter layer, and at least one of a further flow path defining layer or a support layer.

18. A flow path defining layer for a filter material, the flow path defining layer comprising:
individual line elements forming a mesh or grid and being arc-shaped or curved at least to some extent, two of said individual line elements extend adjacent to one another in an arc-shaped manner at least to some extent and define flow chambers between pairs of two consecutive cross points of said two of said individual line elements, a largest opening of each of said flow chambers being formed between two apexes of arc-shaped courses of said two of said individual line elements, said arc-shaped courses of said two of said individual line elements being spaced apart from one another, said two of said individual line elements resting against one another and being on top of one another at said cross points, said two of said individual line elements form angles therebetween that gradually change within a repeat of a repeating pattern of said two of said line elements.

* * * * *